US009426528B2

(12) United States Patent
Kandanala et al.

(10) Patent No.: US 9,426,528 B2
(45) Date of Patent: *Aug. 23, 2016

(54) MULTI-SERVICE STORE

(75) Inventors: Venket Kandanala, Highland Village, TX (US); Lisa A. Caputo, Dade City, FL (US); Nicky Pinakin Joshi, Flower Mound, TX (US); Mousumi Dasgupta, Irving, TX (US); Srimathi Saravanan, Tamil Nadu (IN); Jagadish B. Nagam, Velachery (IN); TamilKumaran Palaniappan, Karur(Dt) (IN); Rajesh Narayan, Virugambakkam (IN); Anand N. Sankaran, MGR Nagar (IN); Jubish C. Parambath, Madipakkam (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/965,967

(22) Filed: Dec. 13, 2010

(65) Prior Publication Data

US 2012/0151533 A1  Jun. 14, 2012

(51) Int. Cl.

| H04N 7/025 | (2006.01) |
|---|---|
| H04N 7/173 | (2011.01) |
| H04N 21/478 | (2011.01) |
| G06Q 30/02 | (2012.01) |
| H04N 21/254 | (2011.01) |
| G06Q 30/06 | (2012.01) |
| H04N 21/443 | (2011.01) |

(52) U.S. Cl.
CPC .... *H04N 21/47815* (2013.01); *G06Q 30/0261* (2013.01); *G06Q 30/0269* (2013.01); *G06Q 30/0271* (2013.01); *G06Q 30/0601* (2013.01); *H04N 21/2542* (2013.01); *H04N 21/4438* (2013.01)

(58) Field of Classification Search
CPC ............... H04N 21/2542; H04N 21/47815; H04N 21/4438; G06Q 30/0269; G06Q 30/0271; G06Q 30/0261; G06Q 30/0601
USPC ................................... 725/34, 35
See application file for complete search history.

(56) References Cited

U.S. PATENT DOCUMENTS

| 6,029,195 | A  | * | 2/2000  | Herz .......................... 725/116 |
| 6,718,553 | B2 | * | 4/2004  | Kenworthy ................. 725/118 |
| 7,069,576 | B1 | * | 6/2006  | Knudson et al. ........... 725/105 |
| 7,596,797 | B1 | * | 9/2009  | Kapner et al. .............. 725/46 |
| 7,856,646 | B1 | * | 12/2010 | Groff et al. ................. 725/42 |
| 2002/0013944 | A1 | * | 1/2002 | Gordon et al. ............. 725/39 |
| 2002/0069407 | A1 | * | 6/2002 | Fagnani et al. ............ 725/35 |
| 2002/0166126 | A1 | * | 11/2002 | Pugh et al. ................ 725/78 |
| 2002/0184629 | A1 | * | 12/2002 | Sie ....................... G06F 3/0482 725/41 |
| 2004/0136698 | A1 |   | 7/2004 | Mock |
| 2004/0139472 | A1 | * | 7/2004 | Furet et al. ............... 725/109 |
| 2005/0090235 | A1 | * | 4/2005 | Vermola et al. .......... 455/414.3 |

(Continued)

*Primary Examiner* — Benjamin R Bruckart
*Assistant Examiner* — Carmine Malangone

(57) ABSTRACT

A method may include obtaining customer information regarding the user and marketing rules regarding a plurality of store offerings. A number of store offerings from the plurality of store offerings may be identified based on the customer information and the marketing rules. One or more of the identified store offerings may be provided to the user. A user request to purchase a selected one of the provided store offerings may be received. The content or services associated with the selected store offering may be provisioned based on the user request.

20 Claims, 9 Drawing Sheets

(56) References Cited

U.S. PATENT DOCUMENTS

| | | |
|---|---|---|
| 2005/0138653 A1* | 6/2005 | Littrell .......................... 725/23 |
| 2005/0165596 A1 | 7/2005 | Adar et al. |
| 2007/0061860 A1* | 3/2007 | Walker et al. ............... 725/117 |
| 2007/0143787 A1* | 6/2007 | Cankaya ........................ 725/34 |
| 2007/0288959 A1* | 12/2007 | Istvan et al. ................... 725/39 |
| 2008/0133345 A1* | 6/2008 | Cordery et al. ................ 705/14 |
| 2008/0184289 A1* | 7/2008 | Cristofalo et al. ............. 725/34 |
| 2009/0030796 A1* | 1/2009 | Snyder ........................... 705/14 |
| 2010/0043037 A1* | 2/2010 | Beyabani et al. ............ 725/100 |
| 2010/0161375 A1 | 6/2010 | Lloyd et al. |
| 2010/0175092 A1* | 7/2010 | Kikinis et al. ................. 725/61 |
| 2010/0229123 A1 | 9/2010 | Lloyd et al. |
| 2011/0145856 A1* | 6/2011 | Agarwal et al. ............... 725/32 |

\* cited by examiner

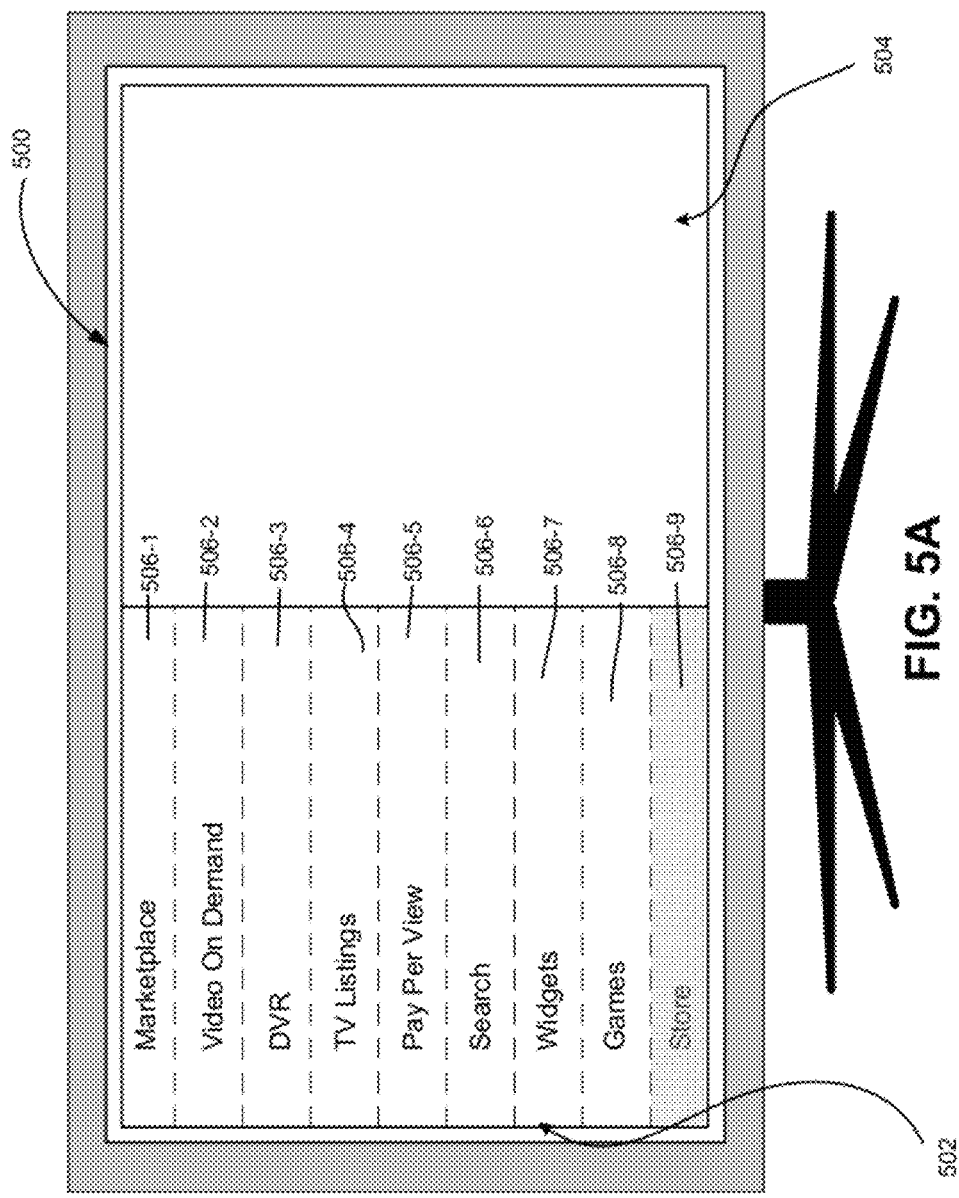

MULTI-SERVICE STORE

BACKGROUND INFORMATION

Modern telecommunications systems may offer subscribers a number of different communications services, such as television service, data service, and mobile and fixed line telephone services. Subscribers to such services may have access to an ever-growing amount and variety of content, services, and equipment, such as broadcast television content, non-broadcast television content (often referred to as "cable" television content), on demand and pay-per-view content, wireless services, widgets, applications, long distance, etc. Subscribers may purchase or subscribe to available content or services by communicating with their providers.

BRIEF DESCRIPTION OF THE DRAWINGS

FIGS. 5A and 5B illustrate exemplary graphical user interfaces for providing intelligent store offerings consistent with implementations described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Implementations described herein relate to devices, methods, and systems for providing users with a unified, multi-service store platform for browsing and purchasing or subscribing to available content and service offerings. Consistent with embodiments described herein, the store platform may support highly granular offerings generated based on various types of information associated with a customer, such as current subscription levels, usage/purchase history, geographic location, customer demographics, etc. One or more generated items or offerings may be presented to a subscriber in an enhanced visual format for review/selection. Once an offer or item is selected, systems consistent with implementations described herein may provision the components or services included within the selected offer for use by the subscriber.

Figure 1:
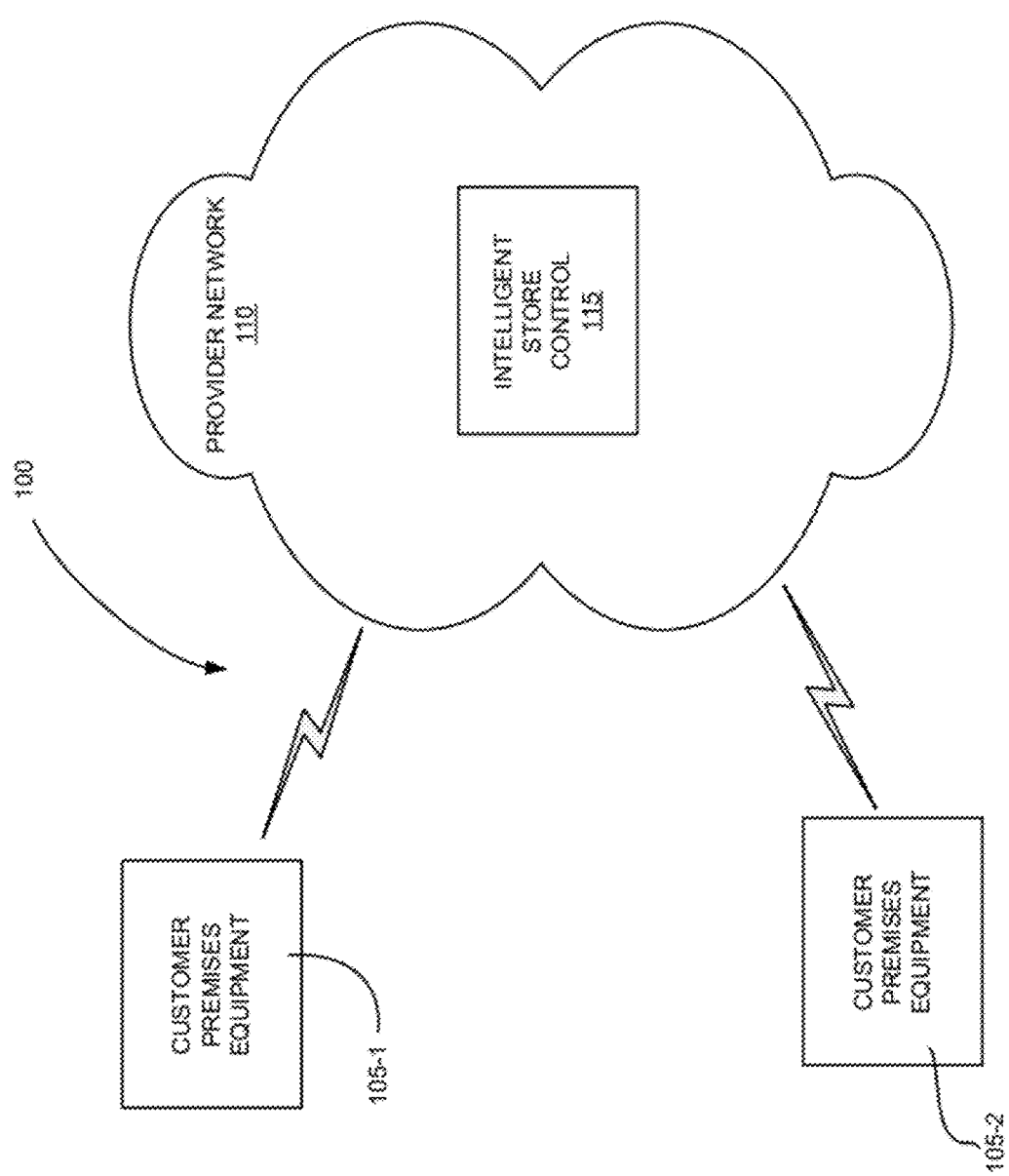
FIG. 1 is a diagram of an overview of an exemplary embodiment for providing multi-feed event viewing.

FIG. 1 is a block diagram depicting an overview 100 of the concepts described herein. Overview 100 may include a first customer premises equipment (CPE) 105-1, a second CPE 105-2, a provider network 110, and intelligent store control 115. For the purposes of this example, CPE devices 105-1 and 105-2 include set-top box (STBs), televisions, personal computers, mobile devices, etc., coupled to provider network 110 via wired, wireless, or optical connections.

Consistent with implementations described herein, intelligent store control 115, associated with provider network 110, may be configured to generate, rank, and/or promote service and/or content offerings for delivery to CPE devices 105-1 and 105-2. As described below, intelligent store control 115 may generate or identify one or more service and/or content offerings based on various information associated with the requesting customer. For the purposes of this disclosure, service and content offerings may include video content packages or combinations of packages, on-demand or pay-per-view content, video, wireless, or data service levels or features, applications or widgets, hardware upgrades (e.g., wireless phones), etc. For example, an identified or generated service/content offering may include an offer for three free months of a Home Box Office (HBO) package upon customer purchase of the HBO package.

Information used by intelligent store control 115 may include customer account profile information that includes the customer's current subscriptions, customer geographic location, etc. Based on this information, an initial set of available offerings for the customer may be identified. Specific offerings or rankings of the identified offerings may be selected from within this set may then be generated based on additional information, such as historical information associated with a customer, such as viewing history (e.g., pay-per-view history), order history, digital video recorder (DVR) history, customer preferences (e.g., viewing preferences, etc.), wireless minutes/data/text messaging history, as well as customer demographics information, such as income level, number and ages of household members, subscriber geographic location (e.g., city, state, street address, etc.). In addition, offerings may be selected/ranked based on other information, such as a user or CPE identifier associated with a particular CPE device (e.g., a bedroom STB, a kitchen TV, etc.).

Intelligent store control 115 may apply one or more business or marketing rules to the retrieved customer-related criteria. Examples of such rules may include trial period limitations, location-based marketing campaigns, etc. In some implementations, intelligent store 115 may identify suitable offerings or rankings of offerings from a pool of available offerings, while in other implementations, intelligent store control 115 may be configured to dynamically generate or construct store offerings from any number of available content or service items.

By using customer and/or CPE specific information to generate, select, or rank offerings, different sets of offerings may be made available to different customers. For example, a first set of offerings (e.g., a number of offerings ranked in a particular order) may be provided to CPE 105-1, while a second set of offerings may be provided to CPE 105-2. Marketing success may be significantly improved by providing a system that enables highly granular identification and delivery of content offerings Following generation/identification of one or more content, service, or equipment offerings, the offerings may be transmitted to CPE devices 105-1 and 105-2 and presented to the user. The user may choose to purchase or subscribe to one of the presented offerings and an indication of this selection may be returned to content provider network 110. The content provider may, in response to the purchase/subscription of an offering, provision CPE 105-1 or 105-2 (or other devices associated with a particular customer) for receipt of channels included in the purchased content packages. Upon subsequent navigation to a channel included in one of the subscribed packages, an STB/TV may present the channel to the user via an interface, such as a menu-driven interactive media guide (IMG).

Figure 2:
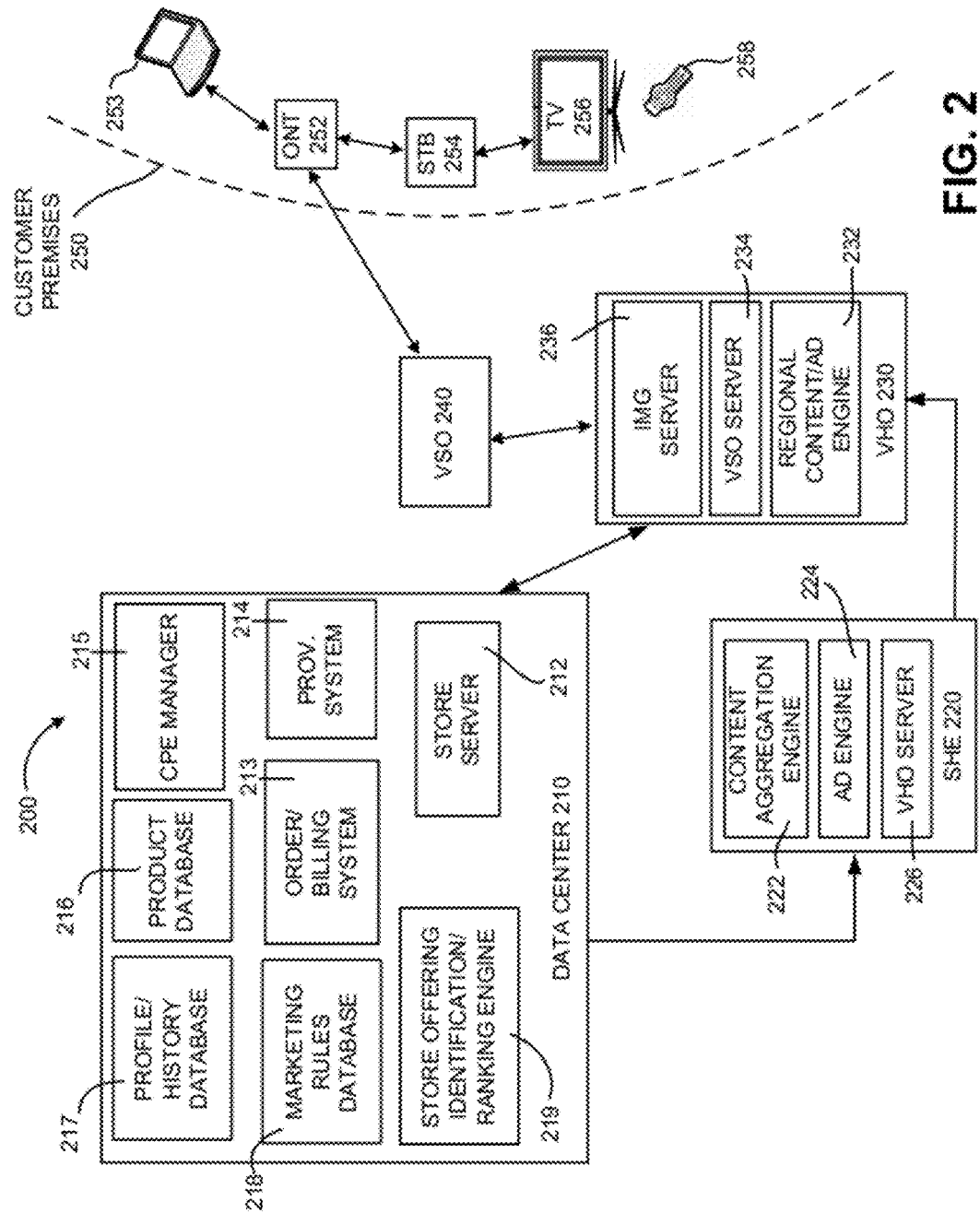
FIG. 2 is a diagram of an exemplary network 200 for implementing the embodiment of FIG. 1 and other embodiments.

FIG. 2 is a diagram of an exemplary network 200 for implementing the embodiment of FIG. 1 and other embodiments. Network 200 may include data center 210, a super head end (SHE) 220, a video hub office (VHO) 230, a video service office (VSO) 240, and customer premises 250.

Customer premises 250 (e.g., the customer's home) may include various CPE devices, such as a television (TV) 256 having a display. Customer premises 250 may also include an optical network terminal (ONT) 252, a computer 253, a set-top box (STB) 254, and a remote control 258. ONT 252 may receive data, e.g., on a fiber optic cable, and may transfer the data to TV 256 or STB 254. Likewise, ONT 252 may receive data from any device in customer premises 250 and may transmit the data to other devices in network 200, e.g., through a fiber optic cable.

Computer 253 and STB 254 may receive content from VSO 240 and output the content to TV 256 for display. In one embodiment STB 254 may include the functionality of a digital video recorder (DVR) for time-shifting recorded content. In some implementations, STB 254 may include a component (e.g., a cable card or a software package) that plugs into a host device (e.g., a DVR, a personal computer, TV 256, a stereo system, etc.) that allows the host device to display content. STB 254 may also be implemented as a home theater personal computer (HTPC), an optical disk player (e.g., digital video disk (DVD) or Blu-Ray™ disc player), a cable card, etc. STB 254 may receive commands from other components in network 200 (e.g., remote control 258).

Remote control 258 may generate wired or wireless commands for controlling other electronic devices, such as TV 256 or STB 254. Remote control 258, in conjunction with STB 254, may allow a user to manually select programs for viewing on TV 256. In one embodiment, remote control 258 may be used in conjunction with STB 254 to allow a user to view and subscribe to subscription offers, for example. Other types of devices (e.g., a keyboard, mouse, mobile phone, etc.) may be used instead of remote control 258.

TV 256 may include speakers as well as a display. TV 256 may play content, for example, received through VSO 240 or from a DVR (e.g., a DVR in STB 254). While some embodiments may use TV 256, other embodiments may display content (e.g., subscription offers) using any device (e.g., a personal computer or mobile phone) capable of receiving and displaying content, for example.

Customer premises 250 may connect to VSO 240. VSO 240 may collect and deliver content (e.g., subscription offers and programming content) to customer premises 250 and may receive data from customer premises 250 for forwarding to the proper destination (e.g., VSO 240, data center 210, or any device in network 200). VSO 240 may include a content server and/or content mixing engine (e.g., a multiplexer/demultiplexer) to select information, such as on-demand content, regional and national video content, interactive content, and/or advertising content, and mix the information together into one or more video streams. VSO 240 may also perform transcoding of the mixed information and/or encoding or encryption functions. In the manner described below, VSO 240 may retrieve and deliver content from other devices in network 200 to customer premises 250. VSO 240, VHO 230, SHE 220, and data center 210, and other devices in network 200 may form part of a high-speed fiber optic network (e.g., FiOS™).

SHE 220 (one of which is shown in FIG. 2 for simplicity) may include a content aggregation engine 222, an advertisement (AD) engine 224, and a VHO server 226. Content aggregation engine 222 may be configured to aggregate national television content from, for example, satellite reception facilities, etc., and convert the content into a format suitable for delivery and distribution via network 200. AD engine 224 may provide and/or manage service provider level national advertising content (e.g., commercials) that is presented within other content prior to distribution to VHO 230. VHO server 226 may transmit national television content (e.g., TNT, ESPN, HBO, Cinemax, CNN, etc.) to one or more regional VHO facilities 230.

Each VHO 230 (one of which is shown in FIG. 2 for simplicity) may include a regional content/advertising engine 232, a VSO server 234, and an IMG server 236. Regional content/ad engine 232 may receive and format regional television content (e.g., local broadcast stations, community access stations, etc.) and regional advertising content for distribution to the VSO facilities 240 operating under each VHO 230. VSO server 234 may provide the national television content (e.g., from SHE 220) and regional television content (e.g., from regional content/ad engine 232) to VSO 240, for subsequent delivery to customer premises 250.

As will be described in additional detail below, in addition to television content, VHO 230 may also provide data for use in presenting service/content/equipment offerings via offer IMG server 236. IMG server 236 may receive information (e.g., from store server 212) for presentation via an IMG presented on STB 254. As described briefly above, the IMG may include a menu-driven interface for presenting the identified and ranked offerings to the user in an effective manner. As shown in the examples described below, one aspect of such an IMG may include a store or store feature for presenting the selected offerings to a customer. In this implementation, IMG server 236 may provide data for use in presenting the IMG to the user via STB 254, such as program scheduling information, images, videos clips, etc. Consistent with implementations described herein, IMG server 236 may also provide store information for integration with a provided IMG.

Data center 210 may include one or more servers or other network devices (collectively, "network devices") that manage and/or store data associated with customer premises 250, customer or user accounts, and available television content (e.g., national and regional/local television content) provided by SHE 220 and/or VHO 230. As shown in FIG. 2, data center 210 may include a store server 212, an order/billing system 213, a provisioning system 214, a customer premises equipment (CPE) manager 215, a product database 216, a profile/history database 217, a marketing rules database 218, and a store offering identification/ranking engine 219. Devices in data center 210 may include one or more computers for hosting programs, such as a web server (e.g., Apache), a database (e.g., MySQL), or other applications, such as back end systems for performance testing, billing, provisioning, etc.

Store server 212 may include a server or system configured to enable customers to view and purchase/subscribe or place orders for new service or equipment or make changes to existing service. For example, as briefly described above, store server 212 may provide an interface for presenting a number of available offerings to customers and receiving selection of one or more of the options. In other words, store server 212 may act as a central repository or store that provides a wide variety of offerings or products to users. Once an offering has been purchased or otherwise selected, store server 212 may interact with order/billing system 213, and/or provisioning system 214 to enter the service selections into a billing system and to initiate any order provisioning workflow entries necessary to provide the service to the customer. Store server 212 may further interact with CPE manager 215 to allow devices in customer premises (e.g., STB 254, TV 256, ONT 252, etc.) to access the selected services. In some instances, this may include "pushing" applications or updates to existing applications to appropriate devices.

Order/billing system 213 may include one or more servers or systems configured to maintain order and billing information regarding customer accounts. For example, order/billing system 213 may include a customer database that maintains customer account and billing information, such as a listing of currently subscribed to services, a number of STBs 254 (or TVs 256, cable cards, etc.), payment information, etc.

Provisioning system 214 may include components configured to provision physical, logical, and/or system resources associated with the customer account and the selected services. Provisioning system 214 may include components for provisioning voice, data, and video services to a customer. In addition, provisioning system 214 may include diagnostic components for determining service capabilities, such as digital subscriber line loop qualification, data speed limitations, etc. In some implementations, provisioning system 214 may include a number of cross-platform provisioning systems, such as data, voice, video, and wireless provisioning systems.

Customer premises equipment (CPE) manager 215 may be configured to manage and control devices or equipment in customer premises 250, such as ONT 252, STB 254, etc. For example, CPE manager 215 may be configured to transmit signals (e.g., via VHO 230 and VSO 220) to STB 254 to authorize reception, decoding, and display of particular television channels, download purchased content or applications to computer 253 or STB 254, etc.

Product database 216 may include a listing of available content, services, or equipment that may be purchased, ordered, or subscribed to by a customer. Exemplary content, services, or equipment may include video content packages, data service levels (e.g., speeds), video services (e.g., DVR or multi-room DVR services), pay-per-view content, on-demand content, applications, wireless account services (e.g., calling minutes, text message plans, wireless data plans, etc.), value-added services, such as navigation, family tracking, security, and backup services, equipment upgrades, etc. In some implementations, product database 216 may include a number of regional databases configured to include product listings corresponding to particular geographic regions.

Profile/history database 217 may include a server that stores information about user preferences and history, preferences/history of a group of users, or other information to determine such preferences. For example, profile/history database 217 may include metadata associated with content/services, etc., previously purchased or consumed by a user or group of users (e.g., a family at customer premises 250). As another example, profile/history database 217 may store information about the types of content/applications/services a user or a group of users prefers. Profile/history database 217 may also store information about customer demographics, such as income level, number and ages of household members, subscriber geographic location (e.g., city, state, street address, etc.).

Marketing rules database 218 may include a server that stores a number of marketing rules used by store offering identification/ranking engine 219. Rules may relate potential offerings or combinations of offerings to various elements of customer-related criteria (e.g., corresponding to current subscription information stored in order/billing system 213 and profile/history database 217). In some implementations, the marketing rules may include ranking information used by store offering identification/ranking engine 219 to rank resulting store offerings. Furthermore, the marketing rules in marketing rules database 218 may be based on national/regional advertising or promotional campaigns.

In some implementations, marketing rules may be linked, such that application of a first rule to a set of customer data may cause application of a second rule. For example, a first marketing rule may direct that a particular offering be presented (e.g., a pay-per-view boxing match) to all customers in the state of Virginia, and a second marketing rule may exclude customers in zip code 20175 from this offering. The second rule may identify a substitute offering in place of the pay-per-view boxing match, such as an offering relating to a Disney promotion. In this example, regional demographics may indicate that residents in zip code 20175 are less likely than residents in the rest of Virginia to purchase a pay-per-view boxing match than Disney content.

Store offering identification/ranking engine 219 may be configured to generate and/or identify store offerings for presentation to customers via, for example, an IMG store. For example, as briefly described above, store offering identification/ranking engine 219 may be configured to generate and/or identify one or more offerings based on customer information and one or more marketing rules. In some implementations, offerings may be periodically generated and provided to store server 212 for delivery to VHO 230. In other implementations, offerings may be generated and provided when queried by store server 212. The customer information may be obtained/retrieved from order/billing system 213, provisioning system 214, and profile/history database 217 and information relating to the various available offerings may be received from product database 216.

Store offering identification/ranking engine 219 may also obtain or retrieve a number of marketing rules from marketing rules database 218 for generating content/service/equipment offerings based on the retrieved customer and offering information. That is, the customer information retrieved from order/billing system 213 and profile/history database 217 and the offering information received from product database 216 may be matched to the marketing rules from marketing rules database 218. When the customer information matches a marketing rule, the associated offering may be selected for providing to the user.

For example, a marketing rule may indicate that customers in one particular geographic region should be offered a three month free trial of the HBO and Showtime packages. Consistent with implementations described herein, marketing rules may be applied on a highly granular basis, resulting in different offerings being presented based on a wide variety of factors. For example, in one implementation, offerings may be differentiated at a sub-customer level. That is, different users or equipment associated with a customer may be provided with different offerings, based on sub-customer information, such as a STB designation (e.g., kitchen, living room, boy's room, etc.) or user information.

For example, a user of a kitchen STB 254 or TV 256 may be presented with offerings related to cooking-related applications or widgets, or on-the-go services, such as text messaging plans, family tracking plans, etc. This may be due to the fact that television viewers in a kitchen environment may be more likely to be interested in these offerings.

In contrast, a user of a family room STB 254 or TV 256 may be presented with offerings relating to movies, gaming, and sports, since it is more likely that a viewer in this environment will be interested in longer duration entertainment activities.

The exemplary configuration of devices in network 200 is illustrated for simplicity. Network 200 may include more devices, fewer devices, or a different configuration of devices than illustrated in FIG. 2. For example, network 200 may include thousands or millions of customer premises. As another example, network 200 may include a cable modem in a customer premises for receiving and transmitting data. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
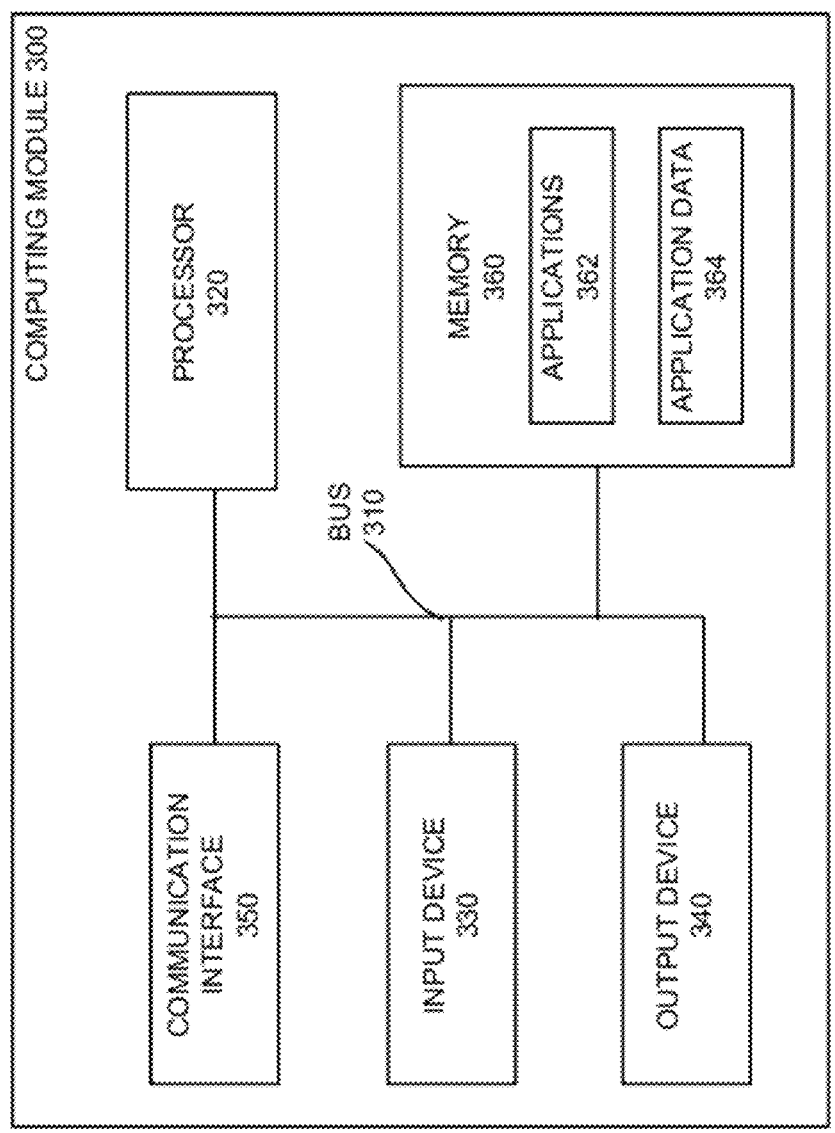
FIG. 3 is a block diagram of exemplary components of a computing module.

Devices in network 200 may each include one or more computing modules. FIG. 3 is a block diagram of exemplary components of a computing module 300. Computing module 300 may include a bus 310, processor 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processor 320 may include any type of processor or microprocessor (or families of processors or microprocessors) that interprets and executes instructions. In other embodiments, processor 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 258), an audio capture device, an image and/or video capture device, a touch-screen display, etc. Some devices, such as components 212-219 may be managed remotely and may not include input device 330. In other words, some devices may be "headless" and may not include a keyboard, for example.

Output device 340 may output information to the user. Output device 340 may include a display, a printer, a speaker, etc. For example, TV 256, a personal computer, etc., may include a display (an output device), which may include a liquid-crystal display (LCD) for displaying content to the user. As another example, ONT 252 and STB 254 may include light-emitting diode (LED) based displays. Headless devices, such as components 212-219 may be managed remotely and may not include output device 340.

Input device 330 and output device 340 may allow a user to activate and interact with a particular service or application, such as an interactive event viewing application, an interactive media guide (IMG), a digital video recorder (DVR), a web browser, or a video editing program. As described briefly above, an IMG consistent with implementations described herein may include a store interface for enabling users to interact with store server 212 to view and/or purchase/subscribe to store offerings. Input device 330 and output device 340 may allow a user to receive and view a number of options or features and select from the options. The options or features may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 362) and data (e.g., application data 364) for use by processor 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive). Applications 362 and application data 364 may provide network services or include applications, depending on the device in which the particular computing module 300 is found.

Computing module 300 may perform the operations described herein in response to processor 320 executing software instructions contained in a computer-readable medium, such as memory 360. A computer-readable medium may include a physical or logical memory device. The software instructions may be read into memory 360 from another computer-readable medium or from another device via communication interface 350. The software instructions contained in memory 360 may cause processor 320 to perform processes that are described herein.

Figure 4A:
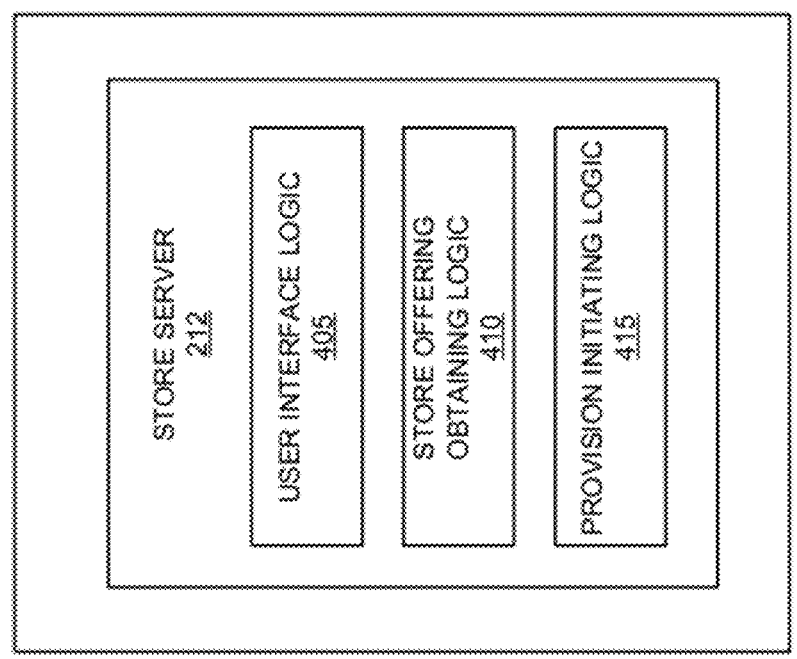
FIG. 4A is a block diagram of exemplary components of the self-service provisioning server of FIG. 2.

As described above, network 200 may enable the generation and presentation of one or more store offerings for selection and self-provisioning by customers. FIG. 4A is a block diagram of exemplary components of store server 212 (e.g., functions performed by applications 362 in processor 320 or stored in memory 360 of store server 212). Store server 212 may include user interface logic 405, store offering obtaining logic 410, and provision initiating logic 415.

User interface logic 405 may include logic configured to receive and transmit information to/from user devices, such as STB 254, TV 256, etc. For example, user interface logic 405 may receive requests from STB 254 relating to selection of one or more available options by a user, such as selection of a store option in an IMG application, a purchase/order/subscribe option, etc. User interface logic 405 may transmit or forward information to STB 254 from other components of data center 210, such as store offering information from store offering identification/ranking engine 219, customer account information from order/billing system 213, and/or preferences or profile information from profile/history database 217.

Store offering obtaining logic 410 may query combo offer recommendation engine 219 to provide one or more combo offers for presenting to the customer via user interface logic 405. For example, store offering obtaining logic 410 may query store offering identification/ranking engine 219 based on an identifier associated with the customer. In other implementations, the query may be based on an identifier associated with STB 254 (e.g., a "circuit identifier"), in place of or in addition to the customer identifier. In some embodiments, querying of store offering identification/ranking engine 219 may performed periodically, such that store server 212 may be updated with current offerings for each customer/STB 254. In other embodiments, store offering identification/ranking engine 219 may be queried dynamically when a user navigates to a store section of the IMG.

Store offering obtaining logic 410 may receive information relating to one or more store offerings from store offering identification/ranking engine 219 and may forward the identified offerings to STB 254 via user interface logic 405. In some implementations, information (e.g., offering identifiers, images, and/or videos (e.g., previews, trailers, demos, etc.) associated with the offerings may forwarded to IMG server 236 on VHO 230 for transmission to VSO 240 as part of an IMG displayed via STB 254. Upon display by STB 254, the information may be retrieved from IMG 236 for use in presenting the offerings to the user.

Provision initiating logic 415 may receive service, channel, package, content, and/or equipment provisioning requests from customers via user interface logic 405. For example, the customer may select a particular store offering at STB 254 for ordering/purchasing (e.g., by selecting an option on a graphical user interface associated with an IMG, etc.). User interface logic 405 may receive this selection and initiate provisioning of the requested service or content via order billing system 213, provisioning system 214, customer premises manager 215, etc.

Figure 4B:
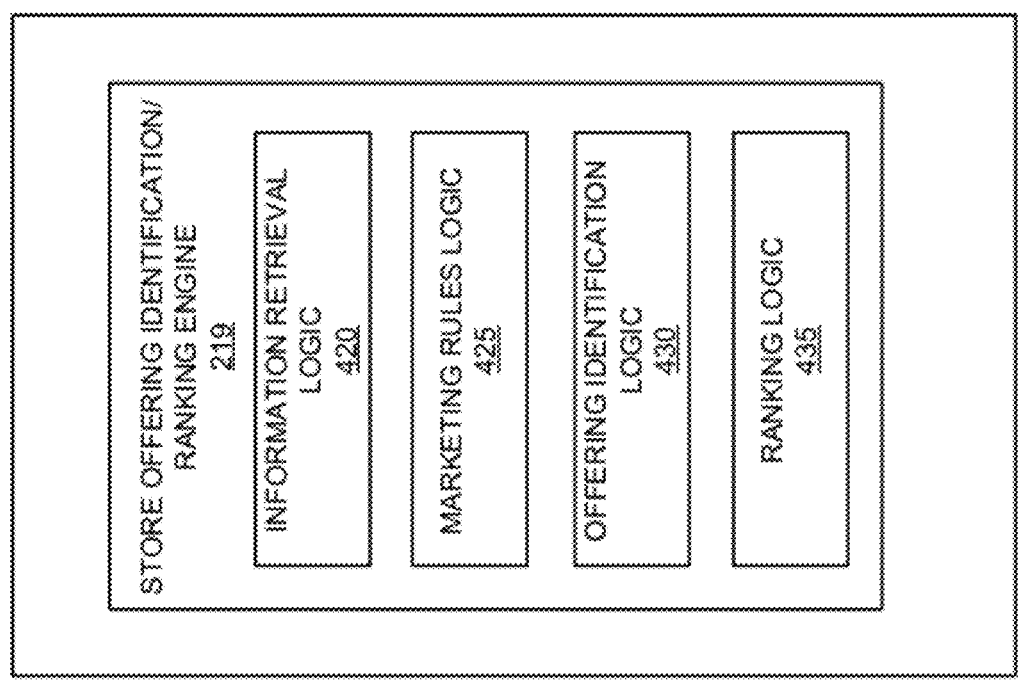
FIG. 4B is a block diagram of an exemplary component of the store offering identification/ranking engine of FIG. 2.

FIG. 4B is a block diagram of exemplary components of store offering identification/ranking engine 219 (e.g., functions performed by applications 362 in processor 320 or stored in memory 360 of store offering identification/ranking engine 219). Store offering identification/ranking engine 219 may include information retrieval logic 420, marketing rules logic 425, offering identification logic 430, and ranking logic 435.

Information retrieval logic 420 may be configured to retrieve information relating to identifying store offerings for a particular customer or STB 254. For example, information retrieval logic 420 may receive a request for store offering information from user interface logic 405. As described above, such a request for store offering information may be based on an identifier associated with the customer or STB 254.

Information retrieval logic 420 may retrieve customer information from order/billing system 213 and profile/history 217 based on the customer/STB 254 identifiers. Exemplary customer information may include current subscription or service information, viewing preferences, demographics information, viewing/order history, prior trial period information, prior promotions information, equipment renewal dates, etc. In addition, information retrieval logic 420 may retrieve or obtain information regarding available content, services, and packages from product database 216.

Marketing rules logic 425 may retrieve a number of marketing rules from marketing rules database 218 based on the retrieved customer information. For example, rules may be retrieved based on geographic location information associated with the customer. In other implementations, all rules in marketing rules database 218 may be retrieved for execution against the obtained customer information by offering identification logic 430.

Offering identification logic 430 may be configured to generate and/or identify store offerings for presentation to users based on the marketing rules information retrieved from marketing rules database 218 and the customer information retrieved from order/billing system 213 and profile/history 217 and the product information retrieved from product database 216. For example, as described above, offering identification logic 430 may compare or match the retrieved marketing rules to the retrieved customer information. When the customer information matches a marketing rule, the associated offering may be selected for providing to the user via store server 212. Offering identification logic 430 may forward information regarding the identified store offerings to store server 212 for delivery to STBs 254.

Ranking logic 435 may be configured to rank the store offerings resulting from execution of the rules by offering identification logic 430. For example, the store offerings identified by applying the marketing rules to the customer information may be ranked by elements of the customer information, such as order history, viewing history, prior offerings presented to a user, etc., even where such information is not used as a basis for the initial offering selection. For example, a marketing rule based solely on customer location may be ranked based on the viewing history of the user for use in determining where in a listing of offerings each particular offering should be placed. In other implementations, identified store offerings may be ranked based on the cost impact to the customer. For example, store offerings resulting in a value to the customer (e.g., relative to a la carte or current subscriptions) may be ranked higher than offerings having a lower value. An example of such an offering includes a text messaging plan that would result in a cost savings to the customer based on the customer's typical usage.

Ranking logic 435 may forward offering rankings to store server 212 for delivery to STBs 254. For example, information regarding the five highest ranking combo offers may be transmitted to store server 212 for delivery to STB 254 via VHO 230 (e.g., IMG server 236), and VSO 240. The information may include store offering description information, store offering pricing information, cost comparison information (e.g. comparing offering pricing to a la carte or current subscription/server level pricing), etc.

Figure 4C:
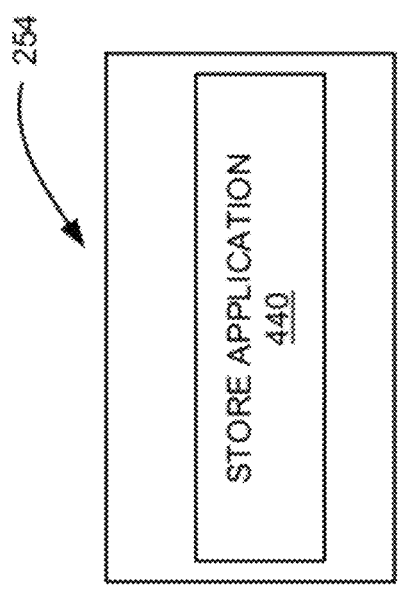
FIG. 4C is a block diagram of an exemplary component of the set-top box of FIG. 2.

FIG. 4C is a block diagram of an exemplary component of STB 254 (e.g., functions performed by applications 362 in processor 320 or stored in memory 360 of STB 254). STB 254 may include a store application 440. TV 256 or any other user device (e.g., a computer, mobile device, etc.) may be similarly configured and may also allow a user to interact with store server 212 to view and/or select one or more store offerings. In some implementations, store application 440 may be integrated or included into an IMG application executing on STB 254. As described above, an IMG application may interact with users and retrieve information corresponding to received selections from IMG server 236.

Store application 440 may include a combination of software and/or hardware components for receiving interface and store offering information from user interface logic 405 of store server 212. More specifically, store application 440 may be configured to present the one or more store offerings identified or selected by store offering identification/ranking engine 219. For example, store application 440 may be configured to, upon activation or execution on STB 254 (e.g., upon user selection of a store option in a graphical user interface (GUI) associated with an IMG), present a GUI for display via TV 256. The GUI may provide users with options relating to viewing available store offerings, and selecting content, services, or equipment associated with the offerings for purchase/subscription. User selections may be transmitted to store server 212 in the manner described above.

FIG. 5A illustrates one exemplary implementation of a user interface consistent with embodiments described herein. As shown, FIG. 5A illustrates a GUI 500 presented to allow user navigation on a main menu associated with an IMG. As shown, GUI 500 may include a hierarchical menu structure, with a higher level region 502 and a sub-level region 504. Upon selection of particular ones of the options in higher level region 502, additional sub-level content options may be provided in sub level region 504.

For main menu GUI 500, higher level region 502 may include a listing of main level options 506-1 to 506-9 available to users. Option 506-1 may be a marketplace option associated with providing options relating to a shopping portal. Option 506-2 may be a video on demand option associated with providing options relating to video on demand content. Option 506-3 may be a DVR option associated with providing options relating to DVR content. Option 506-4 may be a TV listings option associated with providing an interactive listing of television programming. Option 506-5 may be a pay-per-view option associated with providing options relating to pay-per-view content. Option 506-6 may be a search option associated with providing search capabilities across content areas. Option 506-7 may be a widgets option associated with providing options relating to available or previously purchased/downloaded widgets or mini-applications. Option 506-8 may be a games option associated with providing options relating to games content. Option 506-9 may be a store option. As described below, store option 506-9 may provide an interface for viewing and selecting offerings identified and forwarded by store server 212 in the manner described above.

Figure 5B:
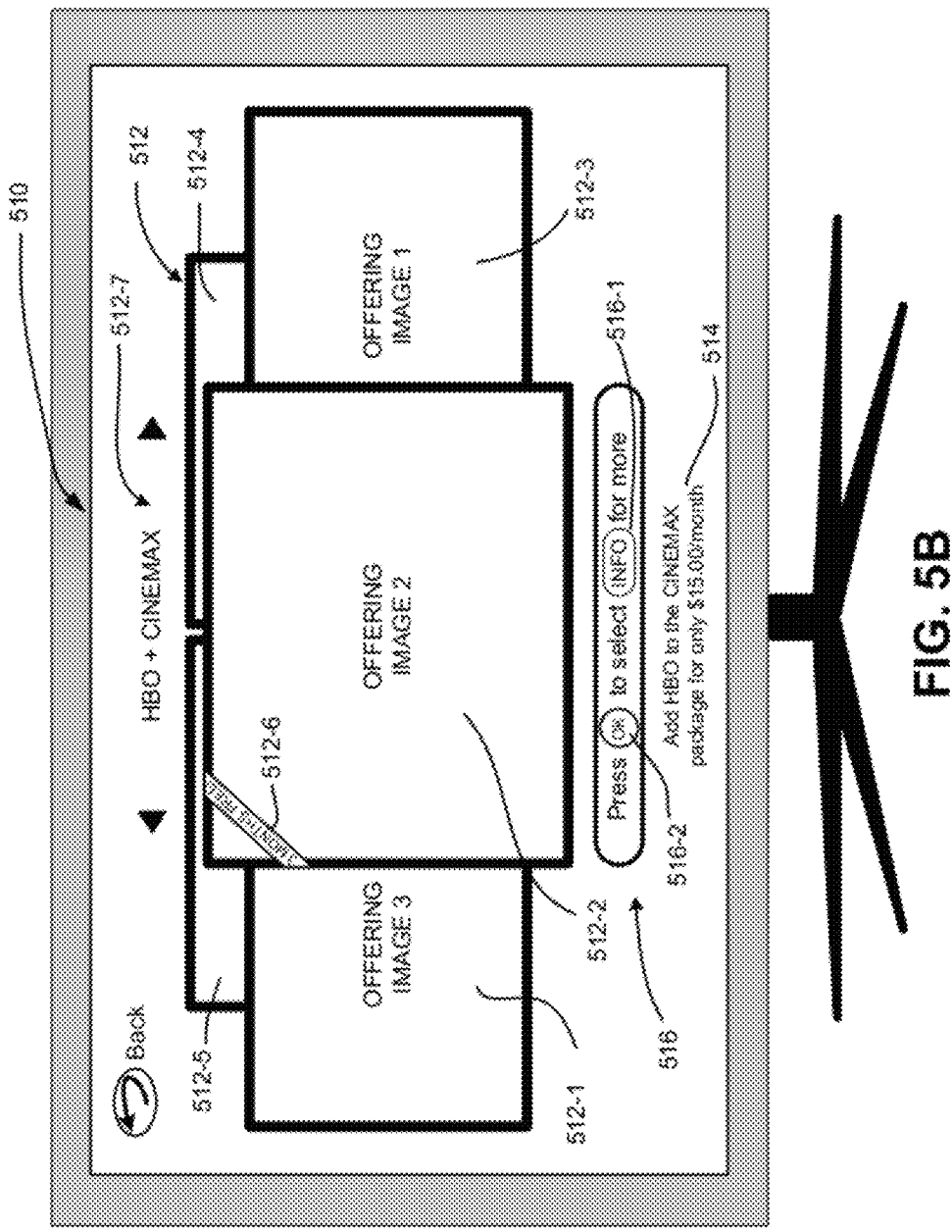

FIG. 5B illustrates an exemplary GUI 510 presented to the user following user selection of store option 506-9 in GUI 500. As shown, GUI 510 may include a store offering presentation section 512, a cost information section 514, and a purchase/more information option interface element 516. Store offering presentation section 512 may include a number of offering image presentation tiles 512-1 to 512-5 (collectively referred to as offering image presentation tiles 512), a name/navigation element 512-4, and a special marker 512-6.

As shown in FIG. 5B, each of store offering image presentation tiles 512-1 to 512-5 include imagery (e.g., images, videos, etc.) corresponding to a different offering identified and/or ranked by store offering identification/ranking engine 219. For example, each store offering image presentation tile 512 may include a still image recognizably representative of one or more elements associated with the offering, such as a channel logo, an icon, etc. For example, tile 512-2 may be associated with a store offering that includes a video package having both HBO and Cinemax channels, tile 512-1 may be associated with a offering for an unlimited text messaging plan, tile 512-3 may be associated with an offering for high speed Internet service, tile 512-4 may be associated with an offering for a video package that includes HBO, Showtime, and four pay-per-view movies per month, and tile 512-5 may be associated with an offering for an expanded on demand library. The imagery provided in store offering image presentation tiles 512 may change periodically in a manner similar to a photo slide show, with each image represent content associated with the respective offering, service, or content.

In some implementations, store offering presentation tiles 512 may be arranged in a manner that facilitates easy user recognition and browsing of the available offerings, such as a grid view, a flip-chart style view, a 3D selection view (as shown in FIG. 5B), or a ranked listing. In the 3D selection view shown in FIG. 5B, a selected or central store offering image presentation tile 512-2 may be enlarged relative to the non-selected side store offering image presentation tiles 512-1, 512-3, 512-4, and 512-5.

As shown in FIG. 5B, store offering image presentation tiles 512 may further include special marker 512-6 to further distinguish one or more features of the respective combo. For example, special marker 512-6 may be configured to describe an available trial period, a cost savings description, an event associated with the combo (e.g., a particular show, such as Entourage, etc.). Although depicted as a ribbon in FIG. 5B, special marker 512-6 may take any suitable appearance, such as an icon, a shape (e.g., star), a banner on the corresponding combo presentation tile 512, etc. In some implementations, more than one special marker 512-6 may be associated with a particular combo presentation tile 512.

The inclusion of special marker 512-6 may be established as part of a store offering by store offering identification/ranking engine 219 and may be included based on customer information, product information, and/or marketing rules. Information regarding special markers 512-6 may be included in the store offering information received by store application 440 in STB 254 from store server 212.

Name/navigation element 512-7 may include a name associated with the selected offering and selectable navigation elements selection that enables the user to navigate between the available store offerings. In some instances, the name provided in name/navigation element 512-7 may be descriptive of the content/service included in the offering, such as "Unlimited Text Messaging," "HBO+Cinemax," etc.

Cost information section 514 may present information relating to the cost to customer of purchasing/ordering the selected store offering. The cost information for each store offering may be included in the store offering information received by store application 440 in STB 254 from store server 212. As described briefly above, in some instances, the offering cost information provided in cost information section 514 may be presented relative to a subscriber's current subscription cost.

Purchase/more information option interface element 516 may include a more option 516-1 and a select option 516-2. User selection of more option 516-1 causes a next set of store offerings to populate GUI 510. For example, upon receiving a user selection of more option 516-1, store application 440 may present the next highest ranked set of store offerings in GUI 510.

When the user wishes to purchase or subscribe to a selected store offering, the user may select "select" option 516-2 (e.g., by selecting an "ok" button on remote control 258, navigating to the select option 516-2 and selecting an "enter" button on remote control 258, etc.). Upon selection of select option 516-2, one or more additional interfaces (not shown) may be provided to the user that include additional information relating to the offering and provide users with the ability to purchase or subscribe to the selected offering.

Figure 6:
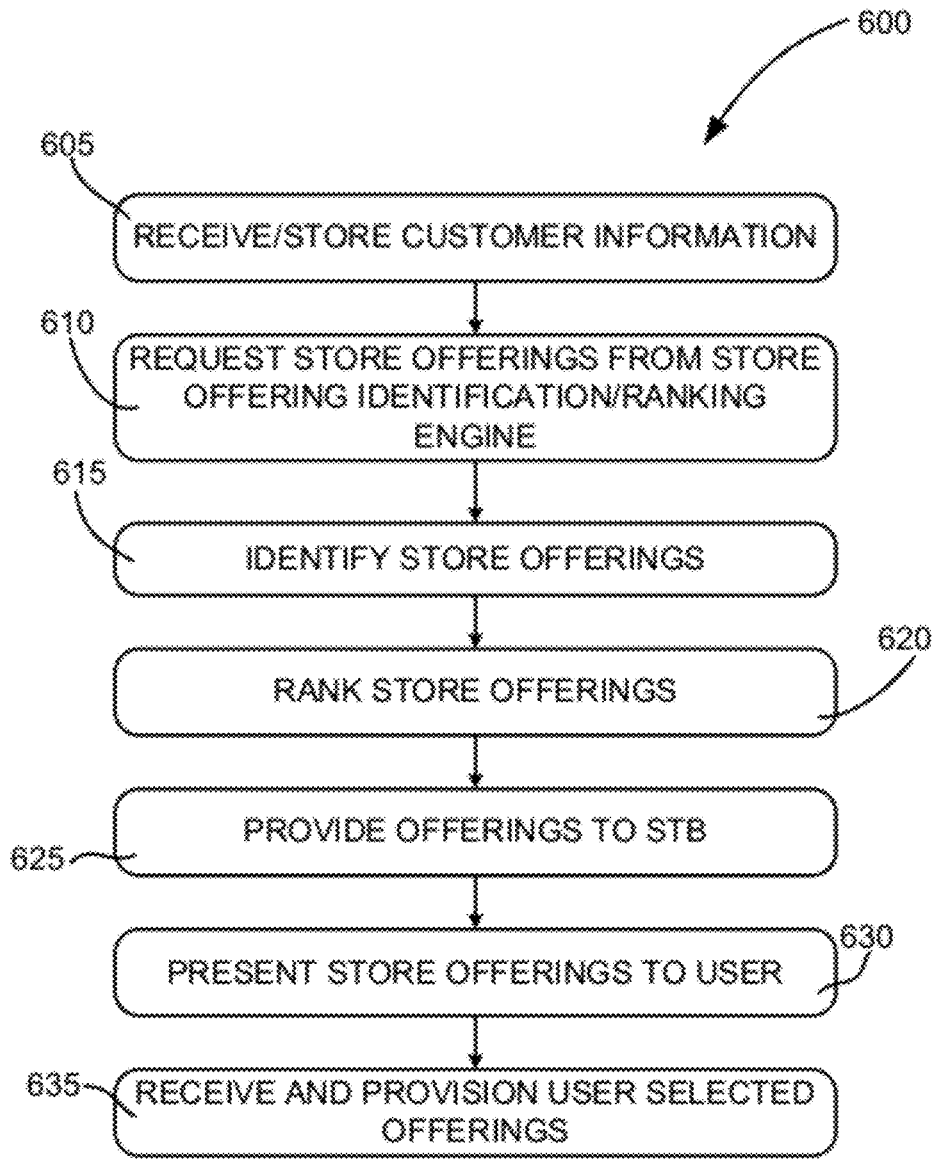
FIG. 6 is a flow diagram illustrating exemplary processing associated with generating/identifying and providing store offerings for selection by a user.

FIG. 6 is a flow diagram illustrating an exemplary process 600 associated with generating/identifying and providing content store offerings for selection or purchase by a user. Process 600 may begin with data center 210 receiving and storing customer profile and preference information relating to the user (block 605). For example, order/billing system 213 may receive and store subscription, billing, purchase/order history, and geographic location information for the user (e.g., for the customer associated with the user). As described above, this information may be cross-platform in nature and may include information relating to a customer's video, data, voice, and wireless services. In addition, profile history database 217 may receive and store user preferences, viewing history, etc.

Store server 212 may request store offerings for forwarding or presenting to a customer or sub-customer (e.g., a particular STB associated with a customer) from store offering identification/ranking engine 219 (block 610). For example, store server 212 may forward customer and/or equipment identification information to store offering identification/ranking engine 219. This information may be provided on a periodic basis, or dynamically upon selection of a store option by a user. Store offering identification/ranking engine 219 may identify or generate one or more offerings in response to the received request (block 615).

For example, as described above, store offering identification/ranking engine 219 may retrieve customer information relating to the store offering request from order/billing system 213 and profile/history database 217. This information may include current subscription information, historical subscription information, user profile/preference information, demographics information, viewing history information, etc. Store offering identification/ranking engine 219 may also retrieve marketing rules from marketing rules database 218 and product information from product database 216. The marketing rules may be associated with the retrieved customer information, e.g., demographics information, location information, etc.

Store offering identification/ranking engine 219 may identify a number of store offerings for presentation to users based on the customer information, the available product information, and the retrieved marketing rules. For example, store offering identification/ranking engine 219 may identify a number of available store offerings based on the retrieved marketing rules. The identified offerings may be based on customer information, such as prior purchase history, recency of last free trial period, geographic location of the customer, etc.

Store offering identification/ranking engine 219 may rank the identified offerings based on a likelihood that the user will select the offer, for example (block 620). In some instances, the likelihood of selection or purchase may be based on user profile, preferences, and history information. Store offering identification/ranking engine 219 may provide a number of the highest ranking offerings to STB 254, e.g., via store server 212 (block 625). For example, store application 440 executing on STB 254 may receive store offerings information from store server 212.

Store application 440 may present one or more of the store offerings to the user (block 630). For example, store application 440 may present the store offerings in a number of store offerings image presentation tiles 512 in GUI 510. Store application 440 may receive user selection/purchase confirmation for a selected offering and may forward the purchase confirmation to store server 212 for order fulfillment (e.g., via order/billing system 213, customer premises manager 215, etc.) (block 635).

Implementations described herein relate to devices, methods, and systems for facilitating the generation, and display of offerings for cross-platform telecommunications services, equipment, and content. In some implementations, a telecommunications service provider may identify a number of offerings for selection by the user. Consistent with implementations described herein, the identified offerings may be based on a number of factors including, marketing rules or advertising campaigns, user or customer demographics, customer profile or preference information, and/or the customer's prior viewing or ordering history. The identified offerings may be ranked and provided to the user in a ranked order for browsing and ultimate selection. Upon selection and purchase of an offering, the service provider will provision the system thereby allowing the customer to enjoy/use the purchased content or service.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a data center 210 performing store offering identification and ranking and an STB 254 outputting the store offerings to a user. However, in other implementations, features described herein may be implemented in other devices, such as a web server or web browser, a stand alone device application, etc.

Further, while series of blocks have been described with respect to FIG. 6, the order of the acts associated with the blocks may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:

obtaining, by a server device operated by a cross-platform service provider, video services customer information regarding a first user and a first set-top box associated with a video services customer;

wherein the video services customer is a customer of the cross-platform service provider, wherein the cross-platform service provider operates video distribution services and at least one of data network services, voice network services, or wireless network services;

wherein the video services customer information regarding the first set-top box comprises one of a name assigned to the first set-top box or an indication of a location within a customer premises associated with the video services customer, wherein the name or the indication of the location comprises an identification of a particular room in the customer premises;

identifying, by the server device, likely user interests based on the name or the indication of the location assigned to the first set-top box;

identifying, by the server device, the particular room associated with the name or the indication assigned to the first set-top box;

determining, by the server device, that the first user would likely be interested in viewing store offerings related to activities of a first duration when the particular room is a first type of room;

determining, by the server device, that the first user would likely be interested in viewing store offerings related to activities of a second duration when the particular room is a second type of room;

obtaining, by the server device, marketing rules regarding a plurality of store offerings for services, content, or equipment provided by the cross-platform service provider;

wherein the plurality of store offerings comprise at least two of video distribution service offerings, data network service offerings, voice network service offerings, or wireless network service offerings;

identifying, by the server device, a selected number of store offerings from the plurality of store offerings based on the video services customer information, the marketing rules, and identified user interests;

wherein the selected number of store offerings are related to activities of the first duration when the particular room is the first type of room and wherein the selected number of store offerings are related to activities of the second duration when the particular room is the second type of room;

receiving, by the server device, from the first user and via the first set-top box, a request to view a store via a video services network;

providing, by the server device, two or more of the identified selected number of store offerings for simultaneous display by the first set-top box via the video services network in response to the request, wherein providing the two or more of the selected number of store offerings comprises:

provided store offerings, wherein the one or more images for each of the provided store offerings include imagery that depicts elements included in the respective store offering;

wherein the one or more of images for each of the provided store offerings are displayed in a dynamic manner, in which each displayed image is periodically replaced by another image;

receiving, by the server device and from the first user and via the first set-top box, a request to purchase or subscribe to a selected one of the provided store offerings; and directly provisioning, by the server device, content, services, or equipment associated with the selected store offering based on the request to purchase or subscribe.

2. The computer-implemented method of claim 1, wherein the video services customer information regarding the first user comprises one or more of: current service or subscription level information, demographics information, profile information, preferences information, viewing history information, order history information, or prior offer information.

3. The computer-implemented method of claim 1, wherein the marketing rules comprise sets of store offerings and customer information criteria, wherein identifying the selected number of store offerings based on the video services customer information and the marketing rules, comprises:

comparing, by the server device, the customer information criteria for the marketing rules to the obtained customer information; and identifying, by the server device, the selected number of store offerings associated with the marketing rules for providing to the video services customer in which the customer information criteria matches the obtained customer information.

4. The computer-implemented method of claim 1, further comprising:

obtaining, by the server device, second customer information regarding one or more of a second user or a second set-top box associated with the video services customer;

identifying, by the server device, a second selected number of store offerings from the plurality of store offerings based on the second customer information and the marketing rules, wherein the second selected number of store offerings are different than the selected number of store offerings associated with the first user and the first set-top box;

receiving, by the server device, a second request to view the store from the second user or the second set-top box; and providing, by the server device, one or more of the identified second selected number of store offerings to the second user or the second set-top box.

5. The computer-implemented method of claim 1, further comprising:

ranking, by the server device, the identified selected number of store offerings based on a cost impact to the video services customer; and providing, by the server device, the two or more of the identified selected number of store offerings to the first user via the first set-top box in a ranked order based on the ranking.

6. The computer-implemented method of claim 5, wherein ranking the identified selected number of store offerings is based on a likelihood that the first user will select a particular store offering.

7. The computer-implemented method of claim 6, wherein ranking the identified selected number of store offerings is based on the video services customer information or the marketing rules.

8. The computer-implemented method of claim 1, wherein providing two or more of the identified selected number of store offerings to the first user comprises:
transmitting, by the server device, information relating to the two or more of the identified selected number of store offerings to the first set-top box.

9. The computer-implemented method of claim 8, wherein the information relating to the two or more of the identified selected number of store offerings comprises references to the one or more images corresponding to the two or more store offerings.

10. A system comprising:
a cross-platform service provider that operates video distribution services and at least one of data network services, voice network services, or wireless network services; and
a first user device connected to the cross-platform service provider via a network,
wherein the cross-platform service provider:
obtains customer information associated with the first user device, wherein the customer information comprises at least a name assigned to the first user device within a customer premises that is indicative of a particular room in the customer premises;
obtains marketing rules regarding a plurality of content or service offers associated with the cross-platform service provider,
wherein the plurality of content or service offers comprise at least two of video distribution service offerings, data network service offerings, voice network service offerings, or wireless network service offerings;
identifies two or more content or service offers from the plurality of content or service offers based on the customer information and the marketing rules,
wherein the two or more content or service offers are related to activities of a first length when the particular room is a first type of room, and
wherein the two or more content or service offers are related to activities of a second length when the particular room is a second type of room; and
transmits information relating to the identified two or more content or service offerings to the first user device for simultaneous display by the first user device;
wherein the information comprises one or more images corresponding to each of the identified two or more content or service offerings;
wherein the first user device:
receives a request from a user to view a store for selecting or purchasing content or services;
forwards the request to the cross-platform service provider;
receives the information relating to the identified two or more content or service offers from the cross-platform service provider based on the request;
outputs a graphical user interface for graphically displaying the identified two or more content or service offers based on the received information;
wherein the graphical user interface displays the one or more images, wherein the one or more images for each of the identified two or more content or service offerings include imagery that depicts elements included in the respective content or service offering;
wherein the one or more images are displayed in a dynamic manner, in which each displayed image is periodically replaced by another image;
receives, from the user, a selection of a selected one of the provided content or service offers; and
wherein the cross-platform service provider directly provisions the selected one of the provided content or service offers.

11. The system of claim 10, wherein the marketing rules comprise sets of store offerings and customer information criteria, and wherein the cross-platform service provider:
compares the customer information criteria for the marketing rules to the obtained customer information; and
identifies the two or more content or service offers for transmitting to the first user device when the customer information criteria associated with marketing rules matches the obtained customer information.

12. The system of claim 10, wherein the cross-platform service provider:
generates ranking information for the identified two or more content or service offers based on a cost impact to the video services customer; and
transmits the ranking information to the first user device with the information relating to one or more of the identified two or more content or service offers.

13. The system of claim 12, wherein the ranking information for the identified two or more content or service offers is based on a likelihood that the user will select a particular content or service offers, and
wherein the ranking information for the identified two or more content or service offers is based on at least one of the customer information or the marketing rules.

14. The system of claim 10, wherein the cross-platform service provider comprises:
a data center;
a regional office; and
a local office,
wherein the data center is to:
store the customer information and the marketing rules; and
identify the two or more content or service offers; and
transmit information relating to the identified two or more selected content or service offers to the regional office,
wherein the regional office is to forward the information relating to the identified two or more selected content or service offers to the local office, and
wherein the local office is to forward the information relating to the identified two or more selected content or service offers to the user device.

15. The system of claim 14, wherein the first user device generates the graphical user interface based on the received information and graphics stored by the regional office.

16. The system of claim 14, wherein the graphical user interface enables user navigation between the identified two or more content or service offers.

17. A non-transitory computer-readable medium having stored thereon sequences of instructions which, when executed by at least one processor, cause the at least one processor to:
obtain customer information regarding a first user and a first set-top box associated with a video services customer,
wherein the video services customer is a customer of a cross-platform service provider that operates video distribution services and at least one of data network services, voice network services, or wireless network services,
wherein the customer information regarding the first user comprises one or more of: current service or subscription level information, demographics information, profile information, preferences information, viewing history information, order history information, or prior offer information, and wherein the customer information regarding the first set-top box comprises one of a name assigned to the first set-top box or an indication of a location within a customer premises associated with the video services customer, wherein the name or the indication of the location comprises an indication of a particular room in the customer premises;

obtain marketing rules regarding a plurality of store offerings for services, content, or equipment provided by the cross-platform service provider, wherein the plurality of store offerings comprise at least two of video distribution service offerings, data network service offerings, voice network service offerings, or wireless network service offerings;

identify two or more store offerings from the plurality of store offerings based on the customer information and the marketing rules, wherein the two or more store offerings are related to activities of a first time duration when the particular room is a first type of room, and wherein the two or more store offerings are related to activities of a second time duration when the particular room is a second type of room;

receive a user request to view a store for selecting or purchasing content or services;

simultaneously provide two or more of the identified two or more store offerings to the user based on the received request, wherein the instructions to simultaneously provide the two or more of the identified two or more store offerings comprises one or more instructions to:

provide one or more images corresponding to each of the two or more store offerings, wherein the one or more images for each of the two or more store offerings include imagery that depicts elements included in the respective store offering;

wherein the one or more of images for each of the two or more store offerings are displayed in a dynamic manner, in which each displayed image is periodically replaced by another image;

receive a user request to purchase a selected one of the provided store offerings; and directly provision, by the cross-platform service provider, content or services associated with the selected store offering.

18. The non-transitory computer-readable medium of claim 17, wherein the instructions to simultaneously provide the two or more of the identified two or more store offerings comprises one or more instructions to:

transmit information relating to the two or more of the identified two or more store offerings to the first set-top box.

19. The non-transitory computer-readable medium of claim 18, wherein the information relating to the two or more of the identified two or more store offerings comprises references to the one or more images corresponding to each of the two or more store offerings.

20. The non-transitory computer-readable medium of claim 17, wherein the sequences of instructions which, when executed by at least one processor, further cause the at least one processor to:

rank the identified two or more store offerings based on a cost impact to the video services customer; and provide the two or more of the identified two or more store offerings to the first user via the first set-top box in a ranked order based on the ranking.

* * * * *